Sept. 22, 1959   S. BERNSTEIN   2,905,898
ELECTRONIC READ-OUT CIRCUIT
Filed March 1, 1955
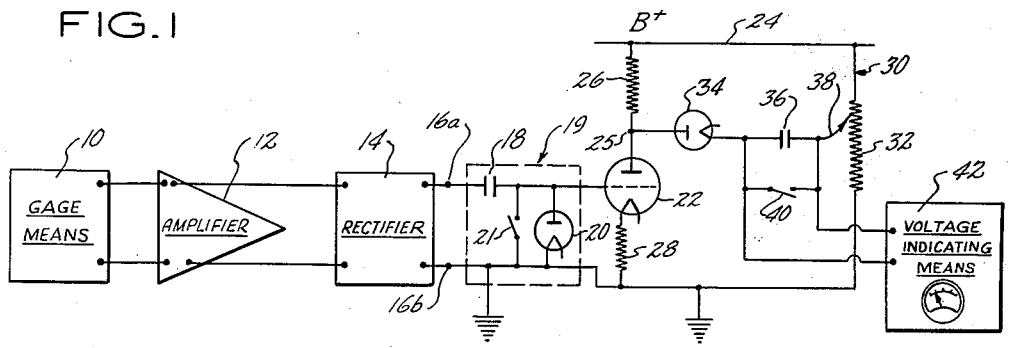
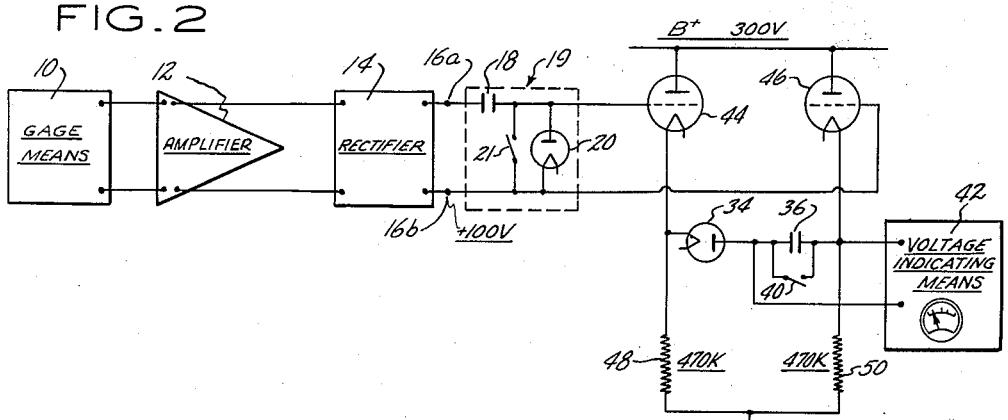
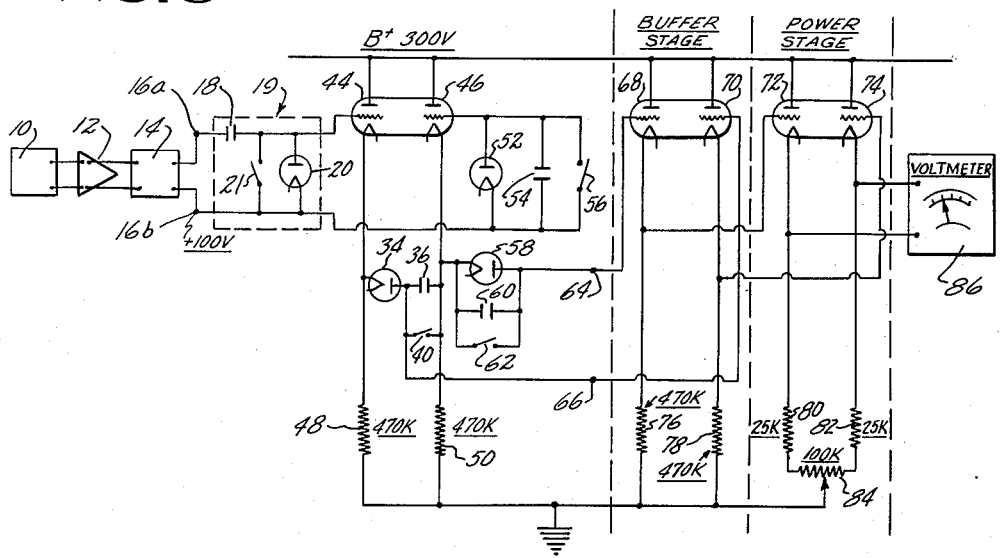
INVENTOR
STANLEY BERNSTEIN
BY Joseph N. Schofield
ATTORNEY

2,905,898
ELECTRONIC READ-OUT CIRCUIT

Stanley Bernstein, Schenectady, N.Y., assignor, by mesne assignments, to Pratt & Whitney Company, Incorporated, West Hartford, Conn., a corporation of Delaware Application March 1, 1955, Serial No. 491,502

1 Claim. (Cl. 324—103)

This invention relates to an electronic read-out circuit for measuring the differential between maximum and minimum gage readings, and for storing this differential reading.

In many industries, in the course of quality control, there arises the perennial problem of quickly and accurately ascertaining variations in: out-of-roundness, eccentricity of inside and outside diameters, flatness, radial play, taper and like measurements for a component or product being manufactured. In most of these applications, the nominal dimensions of the unit under study have already been determined by one of several methods, and there remains the more critical problem of determining excursions in either direction from a norm. In the manufacture of ball and conical roller type bearings for example, concentricity is of extreme importance and the limit of deviation or manufacturing tolerance is narrowly defined. The necessity then, for carefully checking of this parameter obviously increases overall production costs.

In prior art arrangements for obtaining this data, it is necessary for the operator to manually manipulate the unit to be gaged, and at the same time, watch a gage indicator and note the extremes of indicator travel. The accelerated pace in the field of automation in industry, now, increasingly demands that the unit to be measured be moved automatically, and that the net difference in gage readings be obtained quickly and accurately as a single reading.

In a preferred form, the electronic read-out circuit of the present invention comprehends a pair of input terminals and a signal source of D.C. voltage applied to these input terminals, the instantaneous magnitude of the input signal being a function of the parameter being measured. An isolating circuit having an input and an output is provided. A clamping circuit is connected to the input of the isolating circuit for the purpose of applying thereto all signals which are below a predetermined potential level. The clamping circuit includes a storage condenser for maintaining a charge potential which is a function of the maximum of the input signal. A diode and a second condenser are serially connected between the output of the isolating circuit and a source of reference potential, whereby the charge on the condenser is a measure of the differential between the maximum and minimum excursions of the D.C. input potential.

Accordingly, it is an object of this invention to provide an electronic read-out circuit which will measure the differential between maximum and minimum gage readings.

Another object is to provide an electronic read-out circuit which will store the differential change between maximum and minimum gage readings.

Still another object is to provide an electronic read-out circuit for cheaply and reliably measuring and storing the differential change between maximum and minimum gage readings.

The novel features which I believe to be characteristic of my invention are set forth with particularity in the appended claim. The invention itself, however, both as to its organization and method of operation, together with further objects and advantages thereof, may best be understood by reference to the following description when read in connection with the accompanying drawings in which:

Figure 1 is a circuit diagram of an illustrative embodiment of an electronic read-out circuit in accordance with the invention;

Fig. 2 is a circuit diagram of another illustrative embodiment in accordance with the invention; and Fig. 3 is a circuit diagram of still another illustrative embodiment in accordance with the invention.

Referring now to the illustrative embodiment shown in Fig. 1 of the drawing, a piece to be gaged is rotatably displaced within a fixture, in cyclic fashion, for the purpose of determining concentricity. A gaging means, indicated generally at 10 continuously senses the rotating member, and at each instance, an A.C. voltage is derived which is a function of the parameter being measured. The gage means 10 may be of any type in which the output is an electrical equivalent of the variable being measured. In the embodiment here illustrated the gage is of the Electric Gauge type disclosed in U.S. Patent 1,928,457 to Mershon et al.

The A.C. voltage from gage 10 is fed to an amplifier 12, the amplified output being then applied to a rectifier 14 where it is converted into a D.C. signal which is biased so as to be always of positive polarity. (If the gage means selected delivers a D.C. signal, the rectifier will of course be unnecessary.) Thus, the original gage reading is converted into a positive D.C. signal which is applied to the input terminals 16a, 16b of the electronic read-out circuit. One of the input terminals (16b) is maintained at a fixed potential determined by the operating parameters of the circuit, and in this particular embodiment the fixed potential is ground. The other input terminal (16a) is connected to the grid of a triode 22 through a clamping circuit indicated generally at 19. The triode, here arranged as an amplifier, constitutes an isolating circuit between condenser 18 and condenser 36. This will become more evident as the description proceeds.

The clamping circuit 19 comprises a condenser 18, and a thermionic diode 20. One side of condenser 18 is connected to a switch 21, while the other side is connected to input terminal 16a. The switch 21 is connected in shunt with diode 20. The cathode of diode 20 is connected to input terminal 16b to provide the clamping potential. The plate end of diode 20 is connected to the grid of the triode 22. As may be seen from Fig. 1, switch 21 is arranged so that upon closing, condenser 18 is discharged through the input terminals 16a, 16b.

The triode 22 is connected to a source of B+ supply 24 through a plate resistor 26. A biasing resistor 28 is connected between the cathode and ground. A source of reference potential is indicated at 30. For convenience the reference source is here obtained by voltage dividing action by connecting a suitable resistance 32 between the B+ supply 24 and ground. A thermionic diode 34 and a condenser 36 are serially connected as shown between the output of the triode 22 and the reference potential 30, the magnitude of the reference potential being obtained by adjusting tap 38 until the desired potential is obtained.

As will shortly be made clear, the voltage across the condenser 36 is a measure of the differential between the maximum and minimum variations in the input signal. A shorting or discharging switch is shown at 40. The utilizations for this latter condenser voltage are many, and depend upon particular applications. For example, the condenser voltage may be used: to operate an alarm circuit to warn that the piece under test has exceeded the allowable tolerance, to shut down a machine by suitable means such as a thyratron triggering arrangement, to actuate a classification mechanism so as to reject units which are below tolerance, etc., or it may simply be applied to any suitable voltage indicating means shown generally at 42. In order not to discharge the condenser 36, it is necessary that the measuring means have substantially no loading effect on the condenser 36, and hence, means 42 should be an instrument of the infinite impedance type such as an electrometer, as electrostatic voltmeter, or a vacuum tube voltmeter.

Discharge or "Reset" of the circuit is obtained by discharging condensers 18 and 36. Condenser 18 may be discharged by closing switch 21, while condenser 36 is discharged by shunting switch 40. Upon opening these switches the circuit is in the "Operation" or "Ready" position.

The operating principles of this circuit will be more fully explored in connection with the description of Figs. 2 and 3. Briefly, under quiescent conditions, the reference potential is adjusted by means of tap 38 until the potential of the plate 25 of the triode with respect to ground is equal to the potential of the tapped point with respect to ground. Thus the condenser 36 is uncharged.

The dimension being measured is equated to a D.C. input signal. As the input signal approaches its maximum, the condenser 18 is charged to the maximum of the input potential. There is no output from the read-out circuit since the clamping action of circuit 19 maintains the grid of the triode at a fixed bias. As the signal approaches its minimum, however, the grid receives a signal which results in an amplified output for the triode. The plate of the triode 22 is now at a different potential than the tapped reference potential, whereupon condenser 36 charges through diode 34. The magnitude of the charge on condenser 36 is a measure of the differential between the maximum and minimum input potentials.

In the modification of Fig. 2, the isolating circuit is a triode 44 arranged as a cathode follower. Another triode 46 is also driven as a cathode follower and is arranged so as to function as a reference source of potential. These triodes have the usual cathode resistors 48 and 50 which are returned to ground. The plates of triodes 44 and 46 are connected to a suitable B+ source, indicated as +300 v. in the drawing. The grid of triode 44 is connected to the clamping circuit 19, while the grid of triode 46 is connected to input terminal 16b. This latter terminal is maintained at a fixed D.C. potential determined by the operating parameters of the circuit, and in the embodiment here illustrated has a magnitude of the order of +100 volts.

In explaining the operation of the circuit of Fig. 2, it will be most helpful to select some practical signal value, and trace this input signal through the read-out circuit. Accordingly, assume that a unit or product being measured for concentricity has maximum and minimum dimensions which are equated to +125 v. and +120 v. respectively. As the signal approaches its maximum, there is no output from the circuit, the only effect being to charge condenser 18 to a higher potential. For example, suppose the input signal is +125 volts. The diode 20 conducts since its positive side is momentarily at a higher potential than its negative side, thus bringing both plate and diode to a potential of +100 v. Condenser 18 is now charged to +25 v. The grid of triode 44 is at +100 v. since it is connected to the plate of diode 20. If the magnitude of the input signal increases beyond +100 v., the charge on the condenser 18 increases, while the grid of triode 44 remains clamped at +100 v. The charge on condenser 18 is thus a function of the maximum dimensional magnitude of the parameter being measured. Since the grid of triode 46 is also at +100 v., the output for the circuit, taken across condenser 36, is zero. With the resistors 48, 50 of the order of magnitude indicated on the drawing, the respective cathodes assume a potential of about +102 v. with respect to ground.

As the signal begins to decrease in magnitude and approach its minimum value, the potential on the plate of diode 20 is changed, and this change is reflected in the input signal to the grid of tube 44. For example, assume that the signal drops to +120 volts. The potential of the left plate (or plate nearer to the input terminals) of condenser 18 assumes a magnitude of +120 volts, while the right hand plate becomes +95 volts. This is so because the charge on the condenser cannot decrease instantly, and hence, must remain at the value of +25 v. The diode 20 is now cut off since the cathode is more positive than the plate. The grid of tube 44 now assumes a potential of +95 v., and since the tube is driven as a cathode follower, its cathode assumes a potential of about +97 volts. The cathodes of the triodes 44, 46 now reflect a difference in potential of +5 volts, i.e., 102—97=5 volts, and condenser 36 charges through diode 34 to a value of +5 volts. The 5 volt charge is now brought out and applied to the indicating means 42. The circuit may be "Reset" by means of condenser discharge switches 21, 40. When the switches are next opened the circuit is in the "Operation" position in readiness for the next measurement.

It will be observed that variations in the D.C. input signal are reflected in the magnitude of the voltage appearing across condenser 36, and therefore the circuit accurately yields an output which is a measure of the excursions in the input signal, and in turn, the input voltage variations are indicative of the change in dimension of the piece being measured.

When the read-out circuit is placed in the "Operation" or "Ready" position, a creep from zero indication will be observed on the indicating means 42. This spurious response is due principally to the effect of "contact potential" developed by diodes 20 and 34. This departure from zero is not objectionable in some applications and amounts to about 2 volts for an instrument having 25 v. full scale deflection. Where 100 v. full scale deflection can be achieved, the error is 2% which is certainly tolerable for many industrial uses. However, in those situations where such parasitic indication may prove troublesome, it may be completely or substantially eliminated by the circuit of Fig. 3. Before discussing this embodiment in detail, a brief review of "contact potential" principles and their effect on the circuitry of Fig. 2 will be in order.

As is well known, the electrons leaving a thermionic cathode have different initial velocities. In some instances, these initial velocities are large enough to enable some of the electrons to reach the plate, thus lowering its potential to a point where the high velocity emerging electrons will be repelled. For example, in the circuit of Fig. 2, the diode 20 is driven down to a potential in the order of +99 volts, a drop of +1 volt. Thus the grid of triode 44 floats slowly to a value of +99 volts. The cathode of triode 44 follows the grid and attains a voltage of +101. Since the grid of triode 46 is connected to a constant source of +100 volts, it remains at +100 volts, while its cathode remains at +102 volts. The condenser 36 charges through diode 44 and attains a charge of +2 v., which is the cause of the zero creep when the circuit is in the "Ready" or "Operation" position.

Returning now to Fig. 3, in order to eliminate the effects of contact potential, a compensating circuit, consisting of a diode shunted by a condenser, is used with each of diodes 20 and 34. A diode 52 has its plate connected to the grid of triode 46 and its cathode connected to the +100 v. voltage supply. A condenser 54 and a discharging switch 56 are shunted across diode 52. Thus when the circuit is shifted to the "Operation" or "Ready" position, the tendency for the grid of tube 44 to "float" to +99 v. is counterbalanced by the tendency of the grid of tube 46 to likewise "float" slowly to +99 v. Now, since the cathodes follow their respective grids in a cathode follower arrangement, if we forget diode 34 for a moment, there would be a zero potential between these cathodes. However, there still exists the tendency for the "contact potential" of diode 34 to drive the one side of condenser 36 one volt less than the other side, so that, without any compensation, condenser 36 would be charged to +1 v. This may be overcome by connecting a diode 58 to the other side of condenser 36, so that its "contact potential" is algebraically added to the potential across condenser 36. Similarly, the compensating circuit includes a condenser 60 and a discharging switch 62 which are shunted across diode 58.

The output of the read-out stage appears at leads 64 and 66. There is no spurious response at zero indication since the contact potential of diode 58, algebraically added to the voltage across condenser 36, results in leads 64 and 66 being at the same potential above ground.

Where only a small output (sufficient to charge capacitor 36) required from the cathodes of the triodes 44, 46, large cathode resistors (470 K) may be employed. The current through the tubes is thereby kept low, and the grid to cathode voltage remains sufficiently high over the operating range to limit grid current to a sufficiently low value.

If sufficient output is required to drive additional circuitry, a power stage may be required. If an additional pair of triodes, driven as cathode followers, are used, a power stage (connected to leads 64, 66), the plate currents may become too high so that the bias is reduced to the point of excessive grid current, with the result that the voltage across condenser 36 will be affected, i.e., the grid current will charge the condenser to a higher potential.

This difficulty is overcome by using a buffer stage, interposed between the power stage and terminals 64, 66. The buffer stage consists of a pair of triodes 68, 70 arranged as cathode followers. The output at leads 64, 66 is connected respectively to the grids of triodes 68, 70. A third pair of triodes 72, 74, arranged as cathode followers, constitute the power stage. The grids of tubes 72, 74 are connected to the cathodes of triodes 68, 70. Positive battery for the tubes 68, 70, 72 and 74 is obtained by connecting to the +300 supply. The resistors for the cathode followers are returned to ground, and are provided at 76, 78, 80, 82 respectively. The cathode resistors 80, 82 in the power stage, may now be made sufficiently large to limit grid current. In this latter stage there is not the same critical requirement for the prevention of excessive grid current as in the previous stage, since the grids of triodes 72 and 74 are connected to low-impedance cathodes.

The cathode resistors 80, 82 are returned to ground through a common adjustable resistor 84 which has a slide wire arm connected to ground. The purpose of this latter arrangement is to provide a means for compensating for minor manufacturing deviations in the tubes employed in the circuit. The differential output may now be measured by an ordinary voltmeter 86.

In both illustrative embodiments, it is preferable to employ dual diodes and triodes enclosed in a single envelope to provide uniform aging, etc. This arrangement will enhance the accuracy of the read-out circuit since we are primarily interested in differential outputs throughout. In the practical embodiments the diodes may be 6AL5's or 5726's and the triodes may be 6SL7's or 5691's.

While the three illustrative embodiments here described employ triodes driven as cathode followers, it should be obvious that other multi-electrode tubes such as pentodes may also be used. Further, to avoid reformation charge on the condensers, polystyrene capacitors should preferably be used in critical applications.

While certain specific embodiments have been shown and described, it will, of course, be understood that various other modifications may be devised, by those skilled in the art, which will embody the principles found in the true spirit and scope of the invention which is defined in the appended claim.

I claim as my invention:

An electronic read-out circuit comprising first and second input terminals, a plurality of varying D.C. signal voltages, relating to a parameter being measured, applied to the input terminals, first and second thermionic discharge devices connected in cathode follower arrangement, each of said discharge devices comprising a plate, at least one grid, and a cathode, a clamping circuit comprising a first condenser and a first diode having first and second electrodes, said first condenser being connected between said first input terminal and said first electrode, a source of fixed potential, the second input terminal and said second electrode being connected to said fixed potential source, the first electrode being connected to the grid of the first thermionic discharge device, the clamping circuit applying to the grid of first thermionic discharge device all potentials which are below the level of said fixed potential, a first compensating diode, a first compensating condenser shunting said first compensating diode, a second compensating diode, a second compensating condenser shunting said second compensating diode, the grid of the second thermionic device being connected to the second input terminal through the parallel combination of second compensating diode and second compensating condenser, a second diode, a second condenser, said second diode and second condenser being serially connected between the respective cathodes of the first and second thermionic devices, the first compensating diode compensating condenser parallel combination being connected in series with the second condenser, means for resetting said read-out circuit, whereby the voltage across both the second condenser and the first compensating diode-compensating condenser parallel combination is a measure of the differential between the maximum and minimum variations in said plurality of D.C. signal voltages.

References Cited in the file of this patent

UNITED STATES PATENTS

| 1,611,716 | Brown | Dec. 21, 1926 |
| 2,137,846 | Klutke | Nov. 22, 1938 |
| 2,294,065 | Anderson | Aug. 25, 1942 |
| 2,300,198 | Brown | Oct. 27, 1942 |
| 2,591,511 | Clarke | Apr. 1, 1952 |
| 2,694,181 | Lax | Nov. 9, 1954 |

FOREIGN PATENTS

| 697,879 | Great Britain | Sept. 30, 1953 |

OTHER REFERENCES

Publication: "An Impulse Vacuum Tube Voltmeter," by Richard Blake of Naval Research Laboratory, Washington, D.C., N.R.L. Report 4274, No. 111304, Dec. 16, 1953. (Copy available in Patent Office, Division 69, or Dept. of Commerce, Office of Technical Services, Washington 25, D.C.)